United States Patent
Shaltz et al.

[11] 3,855,128
[45] Dec. 17, 1974

[54] FLUID FILTER BYPASS VALVE

[75] Inventors: Gregory P. Shaltz; Carl G. VanLoo, both of Longmont, Colo.

[73] Assignee: Gould, Inc., Mendota Height, Minn.

[22] Filed: Apr. 13, 1973

[21] Appl. No.: 350,705

[52] U.S. Cl. ............... 210/130, 210/133, 210/136
[51] Int. Cl. ............................................. B01d 27/10
[58] Field of Search ............ 210/130, 131, 132, 136

[56] References Cited
FOREIGN PATENTS OR APPLICATIONS
683,247   3/1964   Canada .............................. 210/130

*Primary Examiner*—Samih N. Zaharna
*Assistant Examiner*—Ferris H. Lander
*Attorney, Agent, or Firm*—Wolfe, Hubbard, Leydig, Voit & Osann, Ltd.

[57] ABSTRACT

A fluid filter such as an oil filter for an automotive internal combustion engine. The filter includes an improved bypass valve which is formed by only one extra part cooperating with the conventional end cap on the filter element and the conventional screw plate used to mount the filter on the engine. The extra part is a single unitary valve element which forms a fluid seal around the inner periphery of the end cap, and which includes a resilient free end portion overlapping fluid passageways formed in a portion of the end cap which extends radially inwardly beyond the inner periphery of the filter element. The inherent resiliency of the valve element normally biases the free end portion of the valve element against the end cap to close the passageway, but an increase in the fluid pressure on the inlet side of the end cap flexes the free end portion of the valve element away from the end cap to open the passageway to permit fluid to flow therethrough and bypass the filter element.

5 Claims, 5 Drawing Figures

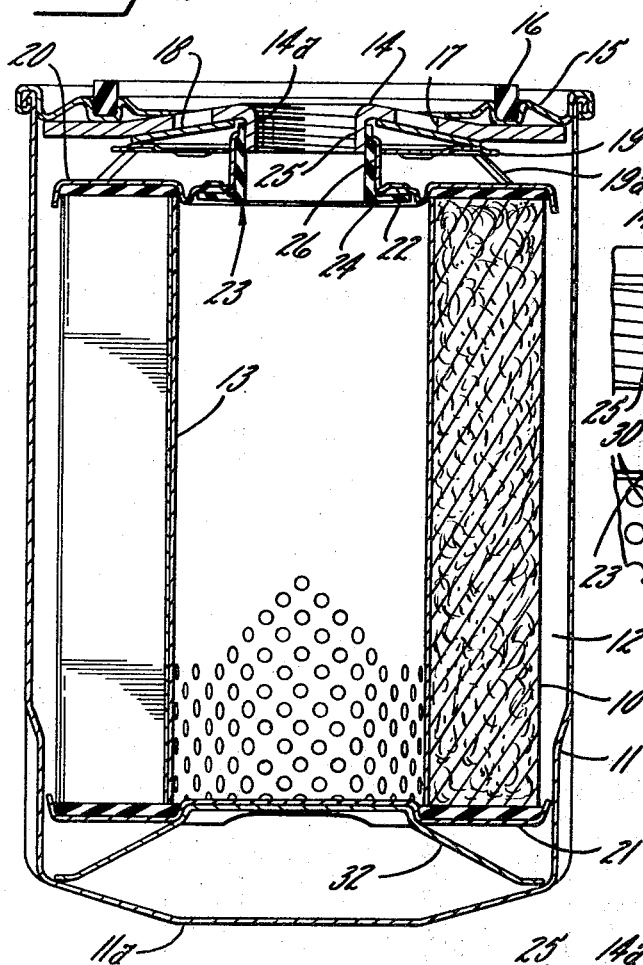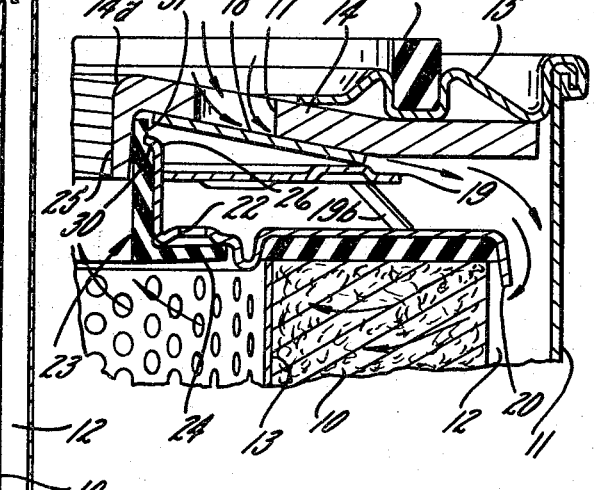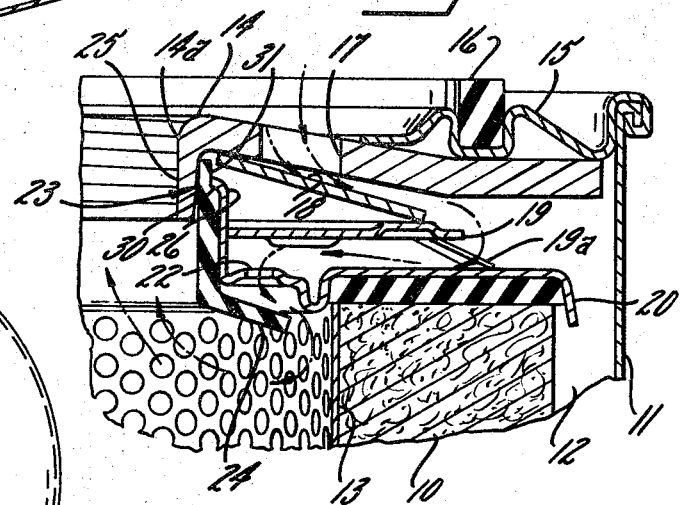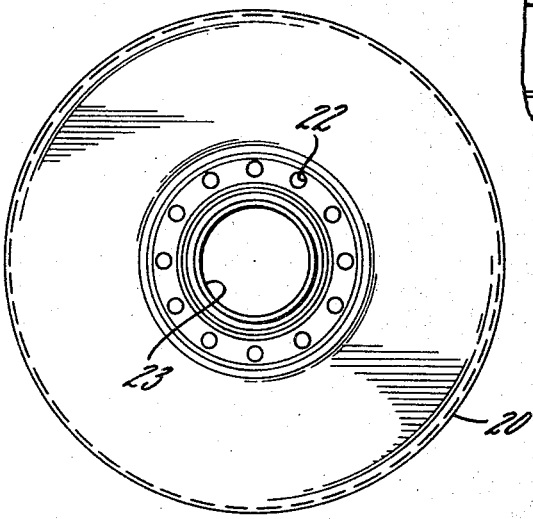

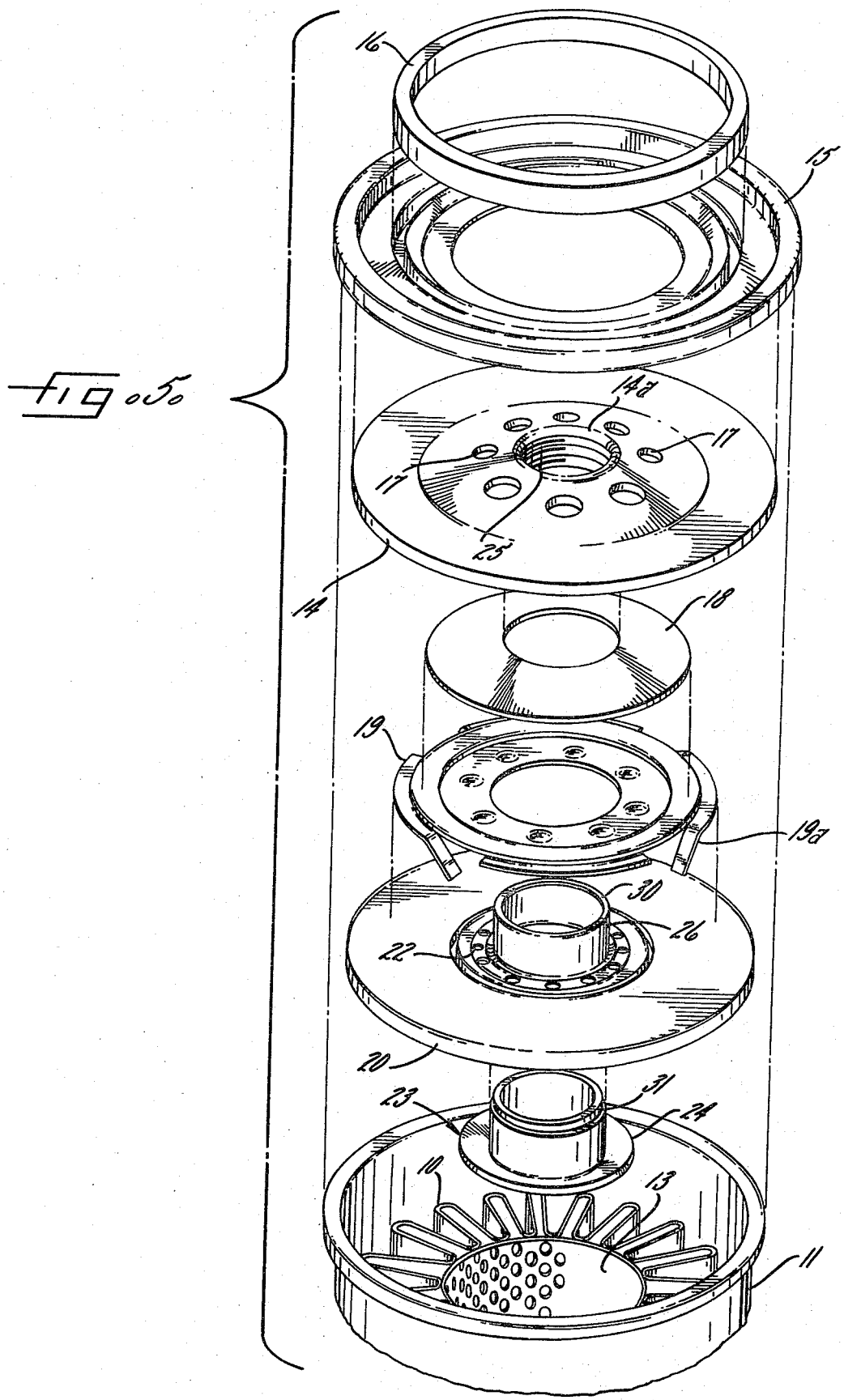

FLUID FILTER BYPASS VALVE

DESCRIPTION OF THE INVENTION

The present invention relates generally to fluid filters of the type used to filter the oil in an internal combustion engine and, more particularly, to bypass valves which are used in such filters to automatically bypass the filtering medium when it becomes clogged with dirt or the like.

It is a primary object of the present invention to provide a fluid filter with an improved bypass valve which provides reliable operation and yet can be manufactured at a low cost and assembled quickly and efficiently.

A related object of the invention is to provide such a filter in which the bypass valve also provides a fluid seal between the end cap on the filtering medium and the screw plate that forms the fluid outlet and that is used to mount the filter.

A more specific object of the invention is to provide such a filter in which the bypass valve comprises only two parts, one of which is the conventional end cap on the filtering medium so that only one extra part is required to form the valve. In this connection, another specific object of the invention is to provide such a filter in which the bypass valve is assembled by simply snapping the single extra part into the end cap.

Other objects and advantages of the invention will be apparent from the following detailed description together with the accompanying drawings, in which:

FIG. 1 is a longitudinal cross section of a fluid filter embodying the invention;

FIG. 2 is an enlarged view of the upper right-hand corner of FIG. 1 with the bypass valve shown in its closed position, and with superimposed arrows indicating the path of fluid below;

FIG. 3 is the same view shown in FIG. 2 but with the bypass valve in its open position, and with superimposed arrows indicating the path of fluid flow;

FIG. 4 is a plan view of the end cap on the upper end of the filter element in the filter of FIGS. 1–3; and FIG. 5 is an enlarged exploded perspective view of the upper portion of the filter of FIGS. 1–4.

While the invention will be described in connection with a certain preferred embodiment, it will be understood that it is not intended to limit the invention to that embodiment. On the contrary, it is intended to cover all alternatives, modifications, and equivalents as may be included within the spirit and scope of the invention as defined by the appended claims.

Turning now to the drawings and referring first to FIG. 1, the invention is illustrated in a filter unit of the type used to filter the oil in an internal combustion engine in an automobile, for example. The filter element 10 is in the conventional form of an elongated annulus which typically comprises one or more sheets of a filtering medium corrugated along longitudinal fold lines. The annular filter element 10 is supported coaxially within a conventional cylindrical housing 11 whose side walls are spaced away from the outer periphery of the element 10 so as to form an elongated annular passageway 12 through which the oil enters the filtering medium.

As the oil passes radially through the element 10 dirt and other particulate matter is retained on the outer surface of the filtering medium, while the cleansed oil passes on through the apertures in a central conduit 13 disposed within the annular filter element 10. The conduit 13 conducts the oil axially through the filter unit to an outlet formed in the center of a screw plate 14 which is internally threaded for mounting the filter unit on a suitable fitting leading to the oil circulation system in the engine. To hold the screw plate 14 captive within the housing 11 of the filter unit, an end plate 15 secured to the housing 11 around its outer periphery covers the outer portion of the plate 14. When the filter unit 10 is mounted on an engine, a gasket 16 held in a circumferential groove in the plate 14 is pressed against an opposed seating surface on the engine to provide a tight fluid seal at the interface between the filter unit 10 and the surface on which it is mounted.

The inlet to the filter unit 10 comprises a circular array of apertures 17 formed in the screw plate 14 in the area between the gasket 16 and the threaded aperture 14a in the center of the plate 14. Oil pressure on the outer surface of the plate 14 is applied through the apertures 17 to an anti-drain back valve ring 18 which is held against the inner surface of the plate 14 by a spring 19. This oil pressure moves the ring 18 away from the plate 14 against the urging of the spring 19, thereby admitting oil into the interior of the housing 11, along the flow path indicated by the arrows in FIG. 2 (although the valve plate 18 is actually in its closed position in FIG. 2). As shown most clearly in FIG. 5, the spring 19 in the illustrative embodiment comprises a metal annulus having a plurality of tangs 19a struck out of its periphery and bent inwardly against the surface of an end cap 20 to provide the desired spring action.

As oil enters the cavity between the plate 14 and the end cap 20, the oil normally flows around the outer periphery of the cap 20 into the passageway 12, and on into the filter element 10. The end cap 20 completely covers the end of the element 10 to block the entry of oil into the end of the filter element 10. At the opposite end of the element 10, another cap 21 covers that end of the filtering medium and also seals the end of the conduit 13. A support plate 32 registers with an indented central area in the cap 21 to hold the filter element 10 in the desired position relative to the closed end wall 11a of the housing 11.

As the filtering medium becomes clogged with dirt or the like, the efficiency of the filter diminishes until it reaches a point at which it is more desirable to bypass the filtering medium than to continue to attempt to pass the oil therethrough. Consequently, a bypass valve is included in the filter unit for conducting the oil directly from the inlet to the outlet of the filter unit, bypassing the filter element 10, in response to an increase in the oil pressure to a predetermined level at the inlet. That is, the clogging of the filtering medium is reflected by increasing oil pressure on the upstream side of the filter element 10, and this pressure is used to actuate the bypass valve. In the illustrative filter, the bypass valve controls fluid flow through a circular array of holes 22 in a portion of the end cap 20 extending radially inwardly beyond the inner periphery of the filter element 10. When these holes 22 are closed, the oil follows its normal flow path through the filter element 10. When the holes 22 are open, however, the oil flows directly from the inlet apertures 17 to the outlet formed by the central opening in the plate 14, thereby bypassing the filter element 10.

In accordance with one important aspect of the present invention, the opening and closing of the bypass holes 22 is controlled by a single unitary valve element 23 having a resilient flange 24 overlapping the holes 22 and normally biased against the end cap 20 to close the holes 22. The resilient flange 24 is free for flexing movement away from the end cap 20 in response to a predetermined increase in the oil pressure on the inlet side of the end cap 20; consequently, when the oil pressure upstream of the filter element 10 increases due to clogging of the filtering medium, the flange 24 is flexed away from the end cap 20 to open the holes 22 thereby permitting oil to flow therethrough, bypassing the clogged filter element 10. Thus, it can be seen that the single unitary valve element 24, which may be made of a suitable oil resistant synthetic rubber, provides the desired bypass valving action.

In addition to its valving function, the element 23 forms a fluid seal around the inner periphery of the end cap 20. Thus, in the illustrative embodiment the element 24 forms a fluid seal between a pair of parallel, overlapping axial flanges 25 and 26 on the screw plate 14 and the end cap 20, respectively. These same flanges 25 and 26 also serve to hold the radially inner portion of the valve element 23 firmly in place by applying a clamping pressure on the portion of the resilient element 23 extending therebetween. The flange 24 of the valve element 23 remains free to flex away from the end cap 20, although its own resilience normally biases it against the end cap 20 to close the bypass holes 22.

As a further feature of the invention, the opposed surfaces of the end cap flange 26 and the valve element 23 are provided with cooperating shoulders 30 and 31 which snap over each other to latch the valve element 23 to the end cap 20. Thus, during assembly of the illustrative device, the valve element 23 is telescoped into the end cap 20 before these elements are put into the housing 11. As the two shoulders 30 and 31 engage each other during the telescoping thereof, the resilient valve element 23 is cammed away from the more rigid metal flange 26 until the two shoulders clear each other, whereupon the resilient element 23 snaps back against the flange 26, latching the two members together. The element 23 and cap 20 are dimensioned so that when this latching action occurs, the free end of the resilien- flange 24 has already engaged the end cap 20 and flexed slightly so that the inherent resiliency of the flange 24 biases it against the cap 20. It will be appreciated that this simple snap-in assembly permits the by-pass valve to be quickly, efficiently and reliably assembled during fabrication of the illustrative device.

We claim as our invention:

1. A fluid filter comprising the combination of an annular filter element, fluid communication means operatively associated with said filter element and including inlet means for conducting fluid to one side of said filter element and outlet means for conducting fluid away from the opposite side of said filter element, an annular end cap attached to one end of said filter element and preventing the entry of fluid into said filter element through said one end thereof, said end cap forming a fluid passageway extending directly from said inlet means to said outlet means so as to bypass said filter element, a screw plate fastened adjacent said end cap and forming an inturned axial flange that is internally threaded for mounting the filter, said end cap forming an axial flange on the inner periphery thereof and telescoped over the inturned axial flange of said screw plate, and a single unitary valve element fitted tightly between the telescoped axial flanges of said end cap and said screw plate to form a fluid seal between the inner periphery of said end cap and the flange of said screw plate, said valve element including a resilient free end portion overlapping said fluid passageway and normally biased against said end cap to close said passageway, said resilient end portion being free for flexing movement away from said end cap in response to a predetermined increase in the fluid pressure in said inlet means so as to open said fluid passageway to permit fluid to flow therethrough and bypass said filter element.

2. A fluid filter as set forth in claim 1 wherein cooperating shoulders are formed on opposed telescoping surfaces of said valve element and said end cap to latch said valve element to said end cap when said surfaces are telescoped over each other.

3. A fluid filter as set forth in claim 1 which includes an anti-drain back valve between said inlet means and said end cap to prevent the flow of fluid out of the filter through said inlet means.

4. A fluid filter as set forth in claim 1 wherein said end cap extends radially inwardly beyond the inner periphery of said filter element, and said fluid passageway is formed by a plurality of holes in said radially inwardly extending portion of said end cap.

5. A fluid filter as set forth in claim 1 wherein said inlet means includes apertures formed in said screw plate.

* * * * *